(12) United States Patent
Dudar et al.

(10) Patent No.: US 10,000,213 B2
(45) Date of Patent: Jun. 19, 2018

(54) SPARE TIRE DETECTION

(71) Applicant: Ford Global Technologies, LLC, Dearborn, MI (US)

(72) Inventors: Aed M. Dudar, Canton, MI (US); Fling Finn Tseng, Ann Arbor, MI (US); Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 134 days.

(21) Appl. No.: 15/058,661

(22) Filed: Mar. 2, 2016

(65) Prior Publication Data

US 2017/0253243 A1    Sep. 7, 2017

(51) Int. Cl.
| | |
|---|---|
| B60W 30/18 | (2012.01) |
| B60C 23/04 | (2006.01) |
| B60W 10/04 | (2006.01) |
| B60W 10/18 | (2012.01) |
| B60W 10/20 | (2006.01) |
| B60W 10/30 | (2006.01) |
| B60W 40/12 | (2012.01) |
| G01C 21/34 | (2006.01) |
| G07C 5/00 | (2006.01) |
| H04L 29/08 | (2006.01) |

(52) U.S. Cl.
CPC ... B60W 30/18009 (2013.01); B60C 23/0474 (2013.01); B60C 23/0479 (2013.01); B60W 10/04 (2013.01); B60W 10/18 (2013.01); B60W 10/20 (2013.01); B60W 10/30 (2013.01); B60W 40/12 (2013.01); G01C 21/3415 (2013.01); G07C 5/008 (2013.01); B60W 2422/70 (2013.01); H04L 67/12 (2013.01)

(58) Field of Classification Search
CPC combination set(s) only.
See application file for complete search history.

(56) References Cited

U.S. PATENT DOCUMENTS

| | | | |
|---|---|---|---|
| 6,771,169 B1 * | 8/2004 | Kaminski | B60C 23/0408 |
| | | | 340/10.33 |
| 7,082,359 B2 | 7/2006 | Breed | |
| 7,116,218 B2 | 10/2006 | Ogawa et al. | |
| 8,009,027 B2 | 8/2011 | Thomas et al. | |
| 8,615,344 B2 | 12/2013 | Boss et al. | |
| 9,566,986 B1 * | 2/2017 | Gordon | B60W 50/12 |
| 2006/0259214 A1 * | 11/2006 | McQuade | B60C 23/0413 |
| | | | 340/445 |

FOREIGN PATENT DOCUMENTS

KR    10-0783959 B1 *    12/2007
KR    20070114902       12/2007

OTHER PUBLICATIONS

KR 10-0783959B1—Kim, 12. 2007—Machine translation.*

* cited by examiner

*Primary Examiner* — Anne M Antonucci
*Assistant Examiner* — Renee LaRose
(74) *Attorney, Agent, or Firm* — Frank A. MacKenzie; Bejin Bieneman PLC

(57) ABSTRACT

A pressure of a spare tire of a vehicle is determined. Whether the spare tire is installed is determined based at least in part on the pressure. A vehicle subsystem is actuated based at least in part on whether the spare tire is installed.

16 Claims, 4 Drawing Sheets

SPARE TIRE DETECTION

BACKGROUND

Vehicles typically carry spare tires to replace a flat tire during operation of the vehicle. Vehicle operators typically detect when the tire is flat and replace the flat tire with the spare tire accordingly. Autonomous vehicles may operate without a human operator to detect the flat tire. Mechanisms are lacking to detect the presence and use of the spare tire.

DETAILED DESCRIPTION

Tire pressure monitoring systems (TMPS) use pressure sensors to detect the presence and use of a spare tire by determining whether a tire pressure increases over a period of time. If the spare tire is in use, and subsequently loses pressure, an autonomous vehicle computer may locate a repair destination and actuate vehicle subsystems to move the vehicle to the repair destination. Upon arrival at the repair destination, the vehicle may provide technicians at the repair destination with information about the tires that prompted the repair in the first place, e.g., a flat tire, a missing spare tire, etc.

Figure 1:
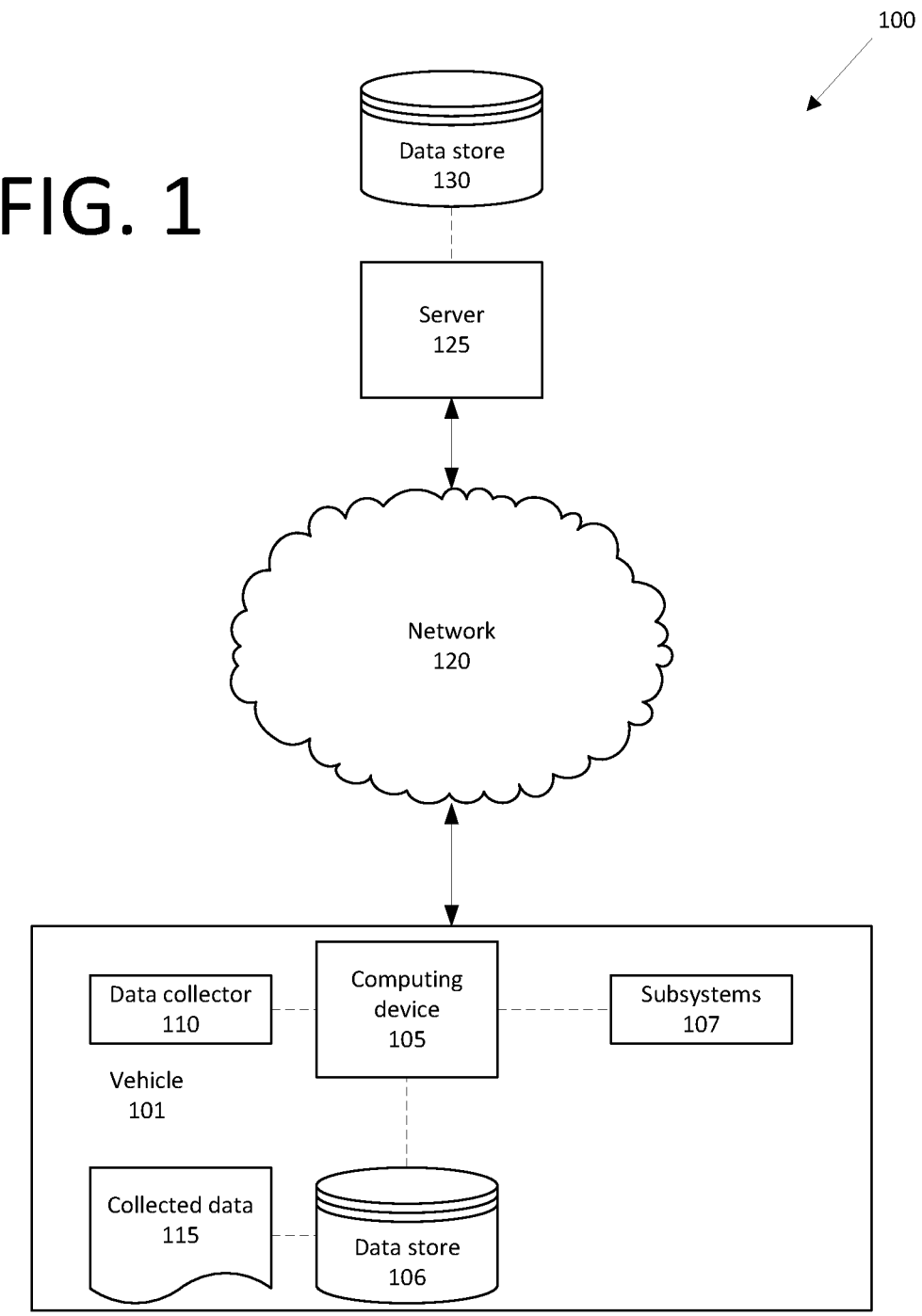
FIG. 1 is a block diagram of an example system for detecting a spare tire.

FIG. 1 illustrates an example system 100 for detecting a spare tire. As is known, a vehicle 101 may include a plurality of tires but may operate with less than all of the plurality of tires. For example, if the vehicle 101 is a sedan, the vehicle 101 may operate with 4 tires installed and one extra uninstalled tire, i.e., a spare tire. The spare tire may be used when one of the installed tires deflates, i.e., goes flat, and cannot be used for operation of the vehicle 101.

A vehicle 101 computing device 105 is programmed to receive collected data 115 from one or more data collectors 110, e.g., vehicle 101 sensors, concerning various metrics related to the vehicle 101. For example, the metrics may include a velocity of the vehicle 101, vehicle 101 acceleration and/or deceleration, data related to vehicle 101 path or steering, pressure of a vehicle 101 tire, etc. Further examples of such metrics may include measurements of vehicle 101 systems and components (e.g. a steering system, a powertrain system, a brake system, internal sensing, external sensing, etc.). Additionally, it is possible that the computer 105 receives data from a remote server, e.g., via a cellular or other wireless network.

The computing device 105 is generally programmed for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type, e.g., hard disk drives, solid-state drives, servers, or any volatile or non-volatile media. The data store 106 may store the collected data 115 sent from the data collectors 110.

The vehicle 101 may include a plurality of subsystems 107. The subsystems 107 include, e.g., a propulsion subsystem (e.g. including an internal combustion engine and/or electric motor, etc.), an entertainment subsystem, a steering subsystem, a braking subsystem, a climate control subsystem, etc. The subsystems 107 may each control at least one vehicle 101 component, e.g., an engine throttle, a human-machine interface, a heater, a condenser, a spark plug, a fuel injector, etc.

Data collectors 110 may include a variety of devices. For example, various controllers in a vehicle may operate as data collectors 110 to provide data 115 via the CAN bus, e.g., data 115 relating to vehicle speed, acceleration, system and/or component functionality, tire pressure, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LIDAR, sonar, etc. sensors that could be deployed to determine environmental data, e.g., to measure a distance between the vehicle 101 and other vehicles or objects, the kinds of objects near the trajectory of the vehicle 101, the road conditions, locations of roads and traffic signs, etc. The data collectors 110 may be part of a tire pressure monitoring system (TMPS), including a pressure sensor 110. The pressure sensor 110 in the TMPS may measure an internal pressure of a vehicle 101 tire is a known manner. Each pressure sensor 110 in the TMPS may include a substantially unique identifier, e.g., serial number, to identify the pressure sensor 110, e.g., as is known.

Collected data 115 may include a variety of data collected in a vehicle 101, including but not limited to tire pressures. Examples of collected data 115 are provided above, and moreover, data 115 is generally collected using one or more data collectors 110, and may additionally include data calculated therefrom in the computer 105. In general, collected data 115 may include any data that may be gathered by the data collectors 110 and/or computed from such data.

The system 100 may further include a network 120 connected to a server 125 and a data store 130. The computer 105 may further be programmed to communicate with one or more remote sites such as the server 125, via a network 120, such remote site 125 possibly including or being connected to a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 as just mentioned may include or be communicatively coupled to a data store 130 for storing collected data 115. The server 125 may store locations of repair destinations that may be accessed when the computing device 105 determines that the vehicle 101 requires a repair, e.g., a change of a flat tire.

Figure 2:
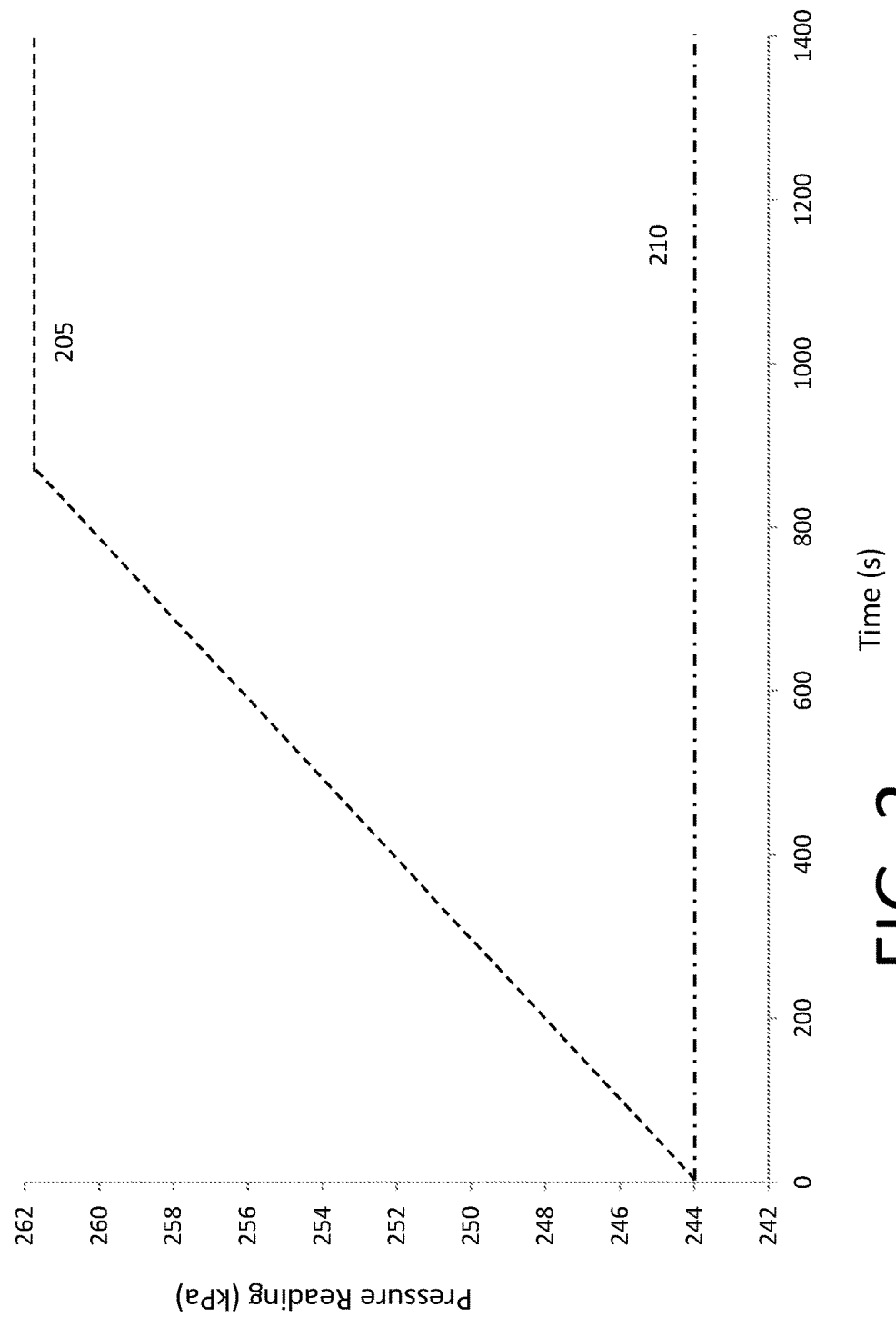
FIG. 2 illustrates an example chart of a pressure reading of the spare tire.

FIG. 2 illustrates an example pressure reading of a spare tire when stowed and when in use. The vertical axis shows the pressure reading from, e.g., a TMPS 110, in kilopascals (kPa). The horizontal axis shows time in seconds (s), with the origin being the start of operation of the vehicle 101. Because an installed tire heats as it contacts the road during operation of the vehicle 101, the pressure inside an installed tire will rise. In FIG. 2, this is represented by the upper curve 205, which shows a spare tire in use. As the spare tire heats up because of friction with the road, the pressure inside the tire will rise until it reaches an equilibrium pressure. The lower curve 210 represents the pressure of a spare tire that is stowed, which maintains a constant pressure reading. The curves 205, 210 of FIG. 2 represent the tire pressure at an ambient temperature of about 70 degrees Fahrenheit (° F.) on a dry road. Because tire pressure differs based on the ambient temperature, the initial pressure reading, e.g., the reading at time=0 seconds, may differ in different ambient temperatures, e.g., in colder or warmer climates. In the example of FIG. 2, the pressure reading of the curve 205, representing the installed tire, starts at 244 kPa and rises for 800 seconds until the temperature in the tire stops rising, at which point the tire pressure reading is about 260 kPa, and stops rising, i.e., a "plateau" pressure. The amount of time for the tire pressure reading to stop rising may vary based on, e.g., ambient temperature, where lower ambient temperatures may result in a longer time for the tire pressure to reach the plateau pressure. The time to reach the plateau pressure may also vary based on the friction between the road and the tire, where lower friction between the road and the tire, e.g., when the road is wet from rain, may produce less heat and the tire pressure may not rise as quickly.

By measuring the pressure of the tire at various times, the computing device 105 can determine whether the spare tire is installed. For example, if the TMPS 110 measures the pressure at two different times, and the pressure reading of the second time is greater than the pressure reading of the first time, indicating an increasing tire pressure, then the computing device can determine that the spare tire is installed. In another example, if the IMPS 110 measures the tire pressure and the value of the tire pressure is higher than a predetermined threshold (e.g., the pressure of the tire when the vehicle 101 is not in operation), then the computing device 105 may determine that the spare tire is in use.

Figure 3:
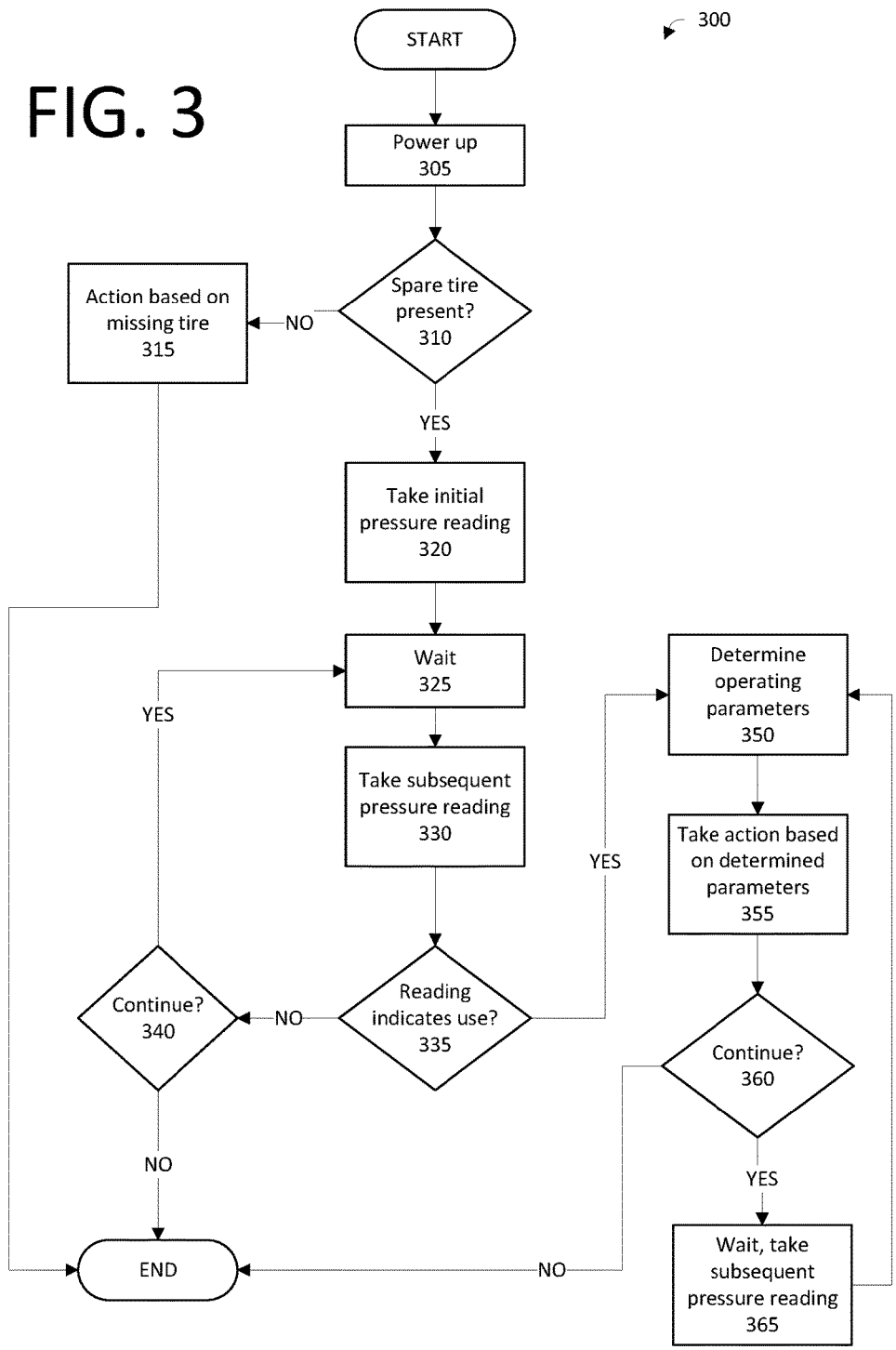
FIG. 3 illustrates an example process for detecting the spare tire and actuating a vehicle subsystem based on the detection of the spare tire.

FIG. 3 illustrates an example process 300 for determining the presence of a spare tire and actuating subsystems 107 based on the presence and use of the spare tire. The process 300 begins in a block 305, where the vehicle 101 operator powers up the vehicle 101.

Next, in a block 310, the computing device 105 determines whether the spare tire is present in the vehicle 101. The computing device 105 may collect data 115 from data collectors 110 to determine whether the spare tire is present, either in a spare tire housing or installed onto a wheel hub.

The data 115 may include, e.g., the serial number of the TMPS sensor 110 installed in the spare tire, the weight of the spare tire in the housing detected by a weight data collector 110, etc. If the spare tire is present in the vehicle 101, the process 300 proceeds in a block 320. Otherwise, the spare tire is missing, and the process 300 proceeds in a block 315.

In the block 315, the computing device 105 actuates the vehicle subsystems 107 based on the missing spare tire, and the process 300 ends. For example, the computing device 105 may actuate a global position system (GPS) 107 to locate a repair destination to replace the spare tire. The computing device 105 may then actuate the propulsion and steering to move the vehicle 101 to the repair destination.

In the block 320, the computing device 105 collects an initial reading (i.e., a first reading) of pressure of the spare tire with, e.g., the TMPS pressure sensor 110. The TMPS pressure sensor 110 measures the internal pressure of the tire, as described above, and sends the data 115 with the pressure reading to the computing device 105. The computing device 105 may collect the initial reading upon activation of the vehicle 101.

Next, in a block 325, the computing device 105 waits for a predetermined period of time. Because the pressure of a vehicle 101 tire in use will increase during operation of the vehicle 101, comparing the pressure readings of the spare tire after a period of time can indicate that the spare tire is in use. The predetermined period of time may be, e g., 800 seconds, as shown in FIG. 2, for an ambient temperature of about 70° F. on a dry road.

Next, in a block 330, the computing device 105 takes a subsequent reading (i.e., a second reading) of the pressure of the spare tire with, e.g., the TMPS pressure sensor 110.

Next, in a block 335, the computing device 105 compares the two pressure readings and determines whether the spare tire is in use. For example, if the second pressure reading is greater than the first pressure reading by more than a predetermined threshold, then the pressure in the spare tire may be increasing, indicating that the spare tire is in use. As shown in FIG. 2, the height of the curve 205, representing the internal pressure of a vehicle 101 tire in use, increases over time as the tire warms up. For example, the pressure at 0 seconds, indicating the start of operation of the vehicle 101, is about 244 kPa. If the subsequent reading at, e.g., 400 seconds reads about 244 kPa, then the pressure of the tire has not increased and the tire is not likely in use. If the subsequent reading at 400 seconds reads about 252 kPa, an increase from the prior reading of 244 kPa, then the tire is likely in use. If the pressure readings indicate that the spare tire is in use, the process 300 continues in a block 350. Otherwise, the process 300 continues in a block 340. The predetermined threshold takes into account minor fluctuations in pressure than could otherwise falsely indicate that a spare tire had been put into use.

In the block 340, the computing device 105 determines whether to continue the process 300. For example, the computing device 105 may determine not to continue the process 300 if the vehicle 101 is powered off, e.g., the transmission is in "park." If the computing device 105 determines to continue, the process 300 returns to the block 325 to wait another predetermined period of time and take another subsequent pressure reading. Otherwise, the process 300 ends.

In the block 350, the computing device 105 determines operating parameters for the vehicle 101. As used herein, the term "operating parameter" refers to a measurable quantity of a vehicle 101 component. For example, for a vehicle 101 tire, an operating parameter may be, e.g., a tire pressure, for a vehicle 101 engine, an operating parameter may be a fuel level, a fuel/air ratio, engine temperature, etc., and for a vehicle 101 transmission, an operating parameter may be a transmission fluid level. The operating parameters may provide information to the repair destination to identify repairs for the vehicle 101.

Because the spare tire is in use, the vehicle 101 will be unable to replace another flat tire. Thus, the computing device 105 determines whether the vehicle 101 will reach a repair destination and the required service at the repair destination. To do so, the computing device 105 determines at least one operating parameter, e.g., tire pressure for non-spare tires, fuel level, engine temperature, etc., to determine the required service for the vehicle 101 and the subsystems 107 to actuate. The computing device 105 compares the operating parameters to predetermined parameter thresholds to determine whether the vehicle 101 component associated with the operating parameter requires service. For example, if a tire pressure for a vehicle 101 tire is below a first threshold, e.g., 20 pounds per square inch (psi), the computing device 105 may determine that the vehicle 101 will reach the repair destination but the tire should be replaced. Further, if the tire pressure is below a second threshold, e.g., 15 psi, the computing device 105 may determine that the vehicle 101 will not reach the repair destination because the tire pressure of the tire is too low. The operating parameters may be determined with, e.g., data 115 collected by data collectors 110.

Figure 4:
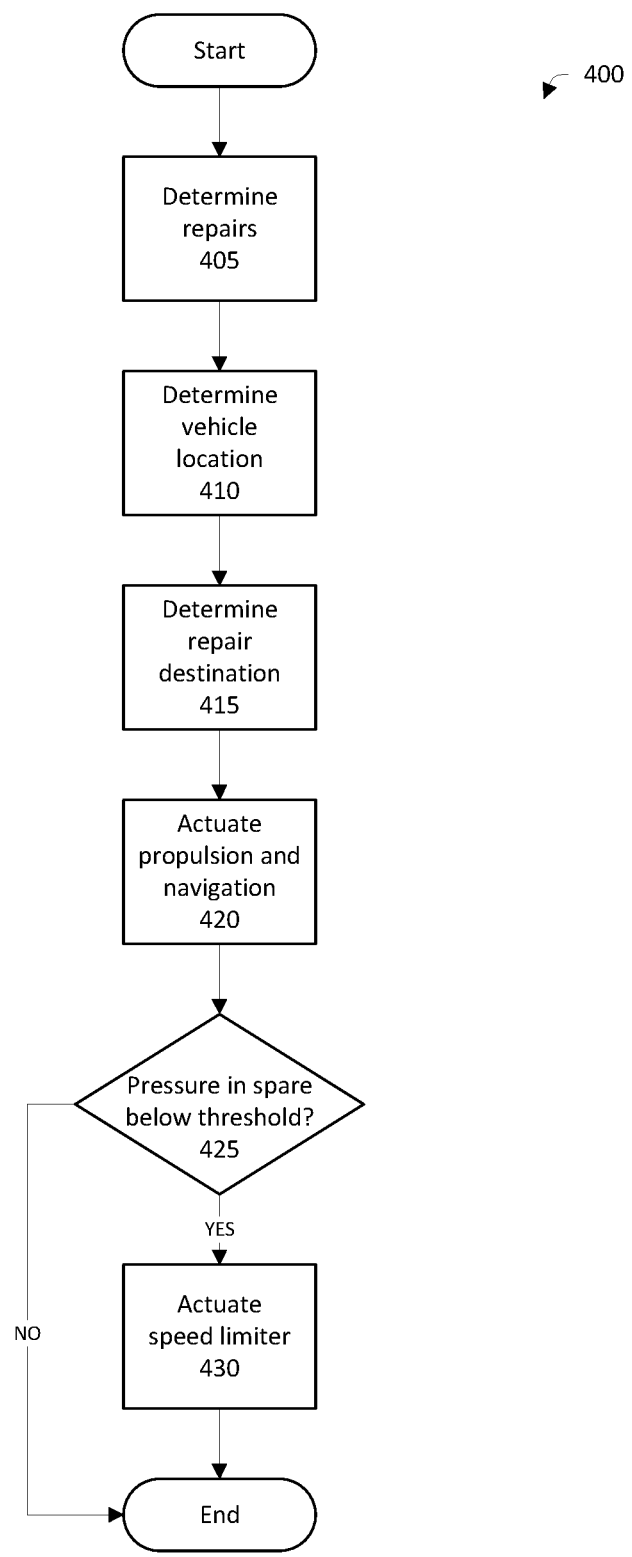
FIG. 4 illustrates an example process for actuating the vehicle subsystem based on the detection of the spare tire.

Next, in a block 355, the computing device 105 actuates subsystems 107 based on the operating parameters. The subsystems 107 actuated will depend on the operating parameters and the necessary action to repair the vehicle 101. For example, if the repair destination is near, and the operating parameters indicate that, e.g., the propulsion subsystem 107 is functioning, then the computing device 105 may actuate propulsion, steering, and navigation subsystems 107 to move the vehicle 101 to the repair destination. In one example, a tire may be rated to travel 300 yards at about 20 miles per hour (mph) when the tire is flat, and if the computing device 105 locates a repair destination within 300 yards, the computing device 105 may actuate the propulsion subsystem 107 to move the vehicle 101 to the repair destination. In another example, if the operating parameters indicate that the vehicle 101 is unable to reach the repair destination, e.g., the repair destination of the previous example is more than 300 yards away, then the computing device 105 may actuate a hazard light subsystem 107 and the propulsion subsystem 107 to move the vehicle 101 to a safe part of a road shoulder and then actuate a communication subsystem 107 to contact the repair destination to send, e.g., a tow truck. FIG. 4 below illustrates an example process 400 for actuating subsystems 107 in the block 355.

Next, in a block 360, the computing device 105 determines whether to continue the process 300. For example, the computing device 105 may determine not to continue if the vehicle 101 has arrived at the repair destination. If the computing device 105 decides to continue, the process 300 continues in a block 365. Otherwise, the process 300 ends.

In the block 365, the computing device 105 waits for the predetermined period of time, as described for the block 325, and then takes another subsequent pressure reading. The process 300 then returns to the block 355, where the computing device 105 determines the operating parameters based on the latest pressure reading.

FIG. 4 illustrates a process 400 for actuating vehicle subsystems 107 in response to the pressure reading of the spare tire. The computing device 105 may run the process 400 in, e.g., the block 355 of the process 300. The process 400 starts in a block 405, where the computing device 105 receives operating parameters from data collectors 110 and determines repairs to the vehicle 101. As described above, the operating parameters are determined from data 115 collected about vehicle 101 components, e.g., propulsion temperature, non-spare tire pressure, brake strength, etc. Based on the parameters, the computing device 105 can determine which vehicle subsystems require repair. For example, because the spare tire is in use, the computing device 105 may determine that the tires require repair and/or replacement.

Next, in a block 410, the computing device 105 determines the location of the vehicle 101. The computing device 105 may determine the vehicle 101 location via, e.g., the navigation subsystem 107, as is known.

Next, in a block 415, the computing device 105 determines a repair destination based on the necessary repairs and the vehicle 101 location. The computing device 105 may, using the navigation subsystem 107, search for destinations that offer the services required to repair the vehicle 101 according to the repairs determined in the block 405. For example, if the computing device 105 determines that one of the vehicle 101 tires requires replacing, the computing device 105 may select a repair destination that offers tire replacement services.

Next, in a block 420, the computing device 105 actuates the propulsion subsystem 107 and the steering subsystem 107 to move the vehicle 101 to the repair destination. Alternatively, e.g., if a repair location cannot be identified, or cannot be identified within a safe distance (e.g., a spare tire may be rated for limited mileage) the computing device 105 may determine a safe location to stop, e.g., a road shoulder, and actuate the propulsion subsystem 107 to move the vehicle 101 to the safe location.

Next, in a block 425, the computing device 105 determines whether the pressure in the spare tire is below a pressure threshold. At low tire pressures, higher vehicle 101 speeds may result in additional wear on the spare tire, necessitating further tire repair. Thus, if the spare tire pressure is below a pressure threshold, the computing device should limit the vehicle 101 speed. An example pressure threshold is 20 psi. If the spare tire pressure is below the pressure threshold, the process proceeds to the block 430. Otherwise, the vehicle 101 continues to the repair destination and the process 400 ends.

In the block 430, the computing device 105 actuates a speed limiter subsystem 107, and the process 400 ends. The speed limiter subsystem 107 limits the speed of the propulsion subsystem 107 to below a speed threshold. The speed threshold may be a predetermined value, e.g., 20 mph for a conventional tire, 50 mph for a "run-flat" tire, i.e. with a support insert and/or an extra tire lining to reduce tire pressure loss when the tire is punctured, as is known, or may be determined based on the spare tire pressure. The speed limiter subsystem 107 may actuate components of the propulsion subsystem 107, e.g., a throttle, a motor, etc., to limit the speed that the vehicle 101 travels.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
    determine a first pressure reading of a pressure of a spare tire of a vehicle from a pressure sensor installed in the spare tire;
    determine a second pressure reading of the spare tire at a predetermined period of time after initial activation of the vehicle;
    determine whether the spare tire is installed when the second pressure reading is greater than the first pressure reading; and
    actuate a vehicle subsystem based at least in part on whether the spare tire is installed.

2. The system of claim 1, wherein the vehicle subsystem is at least one of a propulsion, a brake, a steering, a speed limiter, and a navigation subsystem.

3. The system of claim 2, wherein the instructions further include instructions to actuate the speed limiter to limit a vehicle speed to a speed threshold when the determined pressure of the spare tire is below a pressure threshold.

4. The system of claim 1, wherein the instructions further include instructions to identify a repair destination when the pressure is below a pressure threshold and to actuate the vehicle propulsion and the steering to move the vehicle to the repair destination.

5. The system of claim 4, wherein the instructions further include instructions to determine operating parameters based at least in part on the pressure of the spare tire and to send a notification via a network to the repair destination with the operating parameters.

6. The system of claim 1, wherein the instructions further include instructions to determine whether the tire is present and to actuate the vehicle subsystem upon determining that the spare tire is not present.

7. The system of claim 6, wherein the instructions further include instructions to determine whether the spare tire is present in a spare tire housing and to actuate the vehicle subsystem upon determining that the spare tire is not present in the spare tire housing.

8. The system of claim 6, wherein the instructions further include instructions to detect a serial number of a pressure sensor installed in the spare tire to determine whether the spare tire is present.

9. A method, comprising:
    determining a first pressure reading of a pressure of a spare tire of a vehicle from a pressure sensor installed in the spare tire;
    determining a second pressure reading of the spare tire at a predetermined period of time after initial activation of the vehicle;
    determining whether the spare tire is installed when the second pressure reading is greater than the first pressure reading; and
    actuating a vehicle subsystem based at least in part on whether the spare tire is installed.

10. The method of claim 9, wherein the vehicle subsystem is at least one of a propulsion, a brake, a steering, a speed limiter, and a navigation subsystem.

11. The method of claim 10, further comprising actuating the speed limiter to limit a vehicle speed to a speed threshold when the determined pressure of the spare tire is below a pressure threshold.

12. The method of claim 9, further comprising identifying a repair destination when the pressure is below a pressure threshold and actuating the vehicle propulsion and the steering to move the vehicle to the repair destination.

13. The method of claim 12, further comprising determining operating parameters based at least in part on the pressure of the spare tire and to send a notification via a network to the repair destination with the operating parameters.

14. The method of claim 9, further comprising determining whether the tire is present and to actuate the vehicle subsystem upon determining that the spare tire is not present.

15. The method of claim 14, wherein the instructions further include instructions to determine whether the spare tire is present in a spare tire housing and to actuate the vehicle subsystem upon determining that the spare tire is not present in the spare tire housing.

16. The method of claim 14, further comprising detecting a serial number of a pressure sensor installed in the spare tire to determine whether the spare tire is present.

* * * * *